United States Patent [19]
Edelmann et al.

[11] Patent Number: 6,068,404
[45] Date of Patent: May 30, 2000

[54] BALL BEARING FOR LONGITUDINAL MOVEMENTS

[75] Inventors: Ludwig Edelmann, Sulzthal; Andreas Geyer, Unterspiesheim; Hermann Glöckner, Schweinfurt; Holger Kristandt, Euerbach; Zoltán Lászlófalvi, Dittlebrunn; Uwe Mayer, Münnerestadt; Henryk Velde, Werneck; Lothar Walter, Schweinfurt, all of Germany

[73] Assignee: SKF Linearsysteme GmbH, Schweinfurt, Germany

[21] Appl. No.: 09/156,644

[22] Filed: Sep. 18, 1998

[30] Foreign Application Priority Data

Sep. 20, 1997 [DE] Germany ............ 197 41 626

[51] Int. Cl.[7] .................................................. F16C 29/06
[52] U.S. Cl. .................................................. 384/45
[58] Field of Search .................... 384/43, 44, 45; 464/168

[56] References Cited

U.S. PATENT DOCUMENTS 5,145,260  9/1992  Edelmann et al. .

FOREIGN PATENT DOCUMENTS 1 931 983  1/1971  Germany .

*Primary Examiner*—Lenard A. Footland
*Attorney, Agent, or Firm*—Burns, Doane, Swecker & Mathis, L.L.P.

[57] ABSTRACT

A ball bearing for permitting longitudinal movements with respect to a shaft includes a cage provided with at least two longitudinally extending guide tracks having opposite ends that are connected by semicircular turn around tracks. A plurality of balls are positioned in the guide tracks, with balls positioned in one of the guide tracks forming load-bearing balls and balls positioned in another one of the guide tracks forming non-load-bearing balls. The longitudinally extending guide track for the load-bearing balls is provided with a slit that is open radially inwardly for passage of the balls in a direction radially inwardly towards the shaft. The longitudinally extending guide track for the non-load-bearing balls has an interior wall which, in cross-section, possesses at least two substantially diametrically opposed first sections having a circular contour and at least two substantially diametrically opposed second sections laterally offset from the first sections and having a base that is set back from the circular contour.

19 Claims, 6 Drawing Sheets

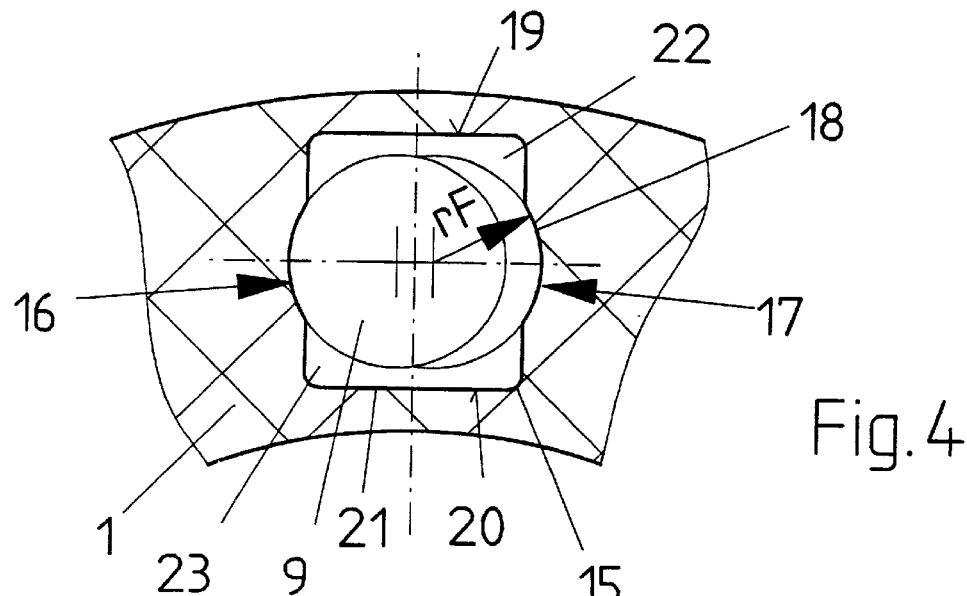
Fig. 4
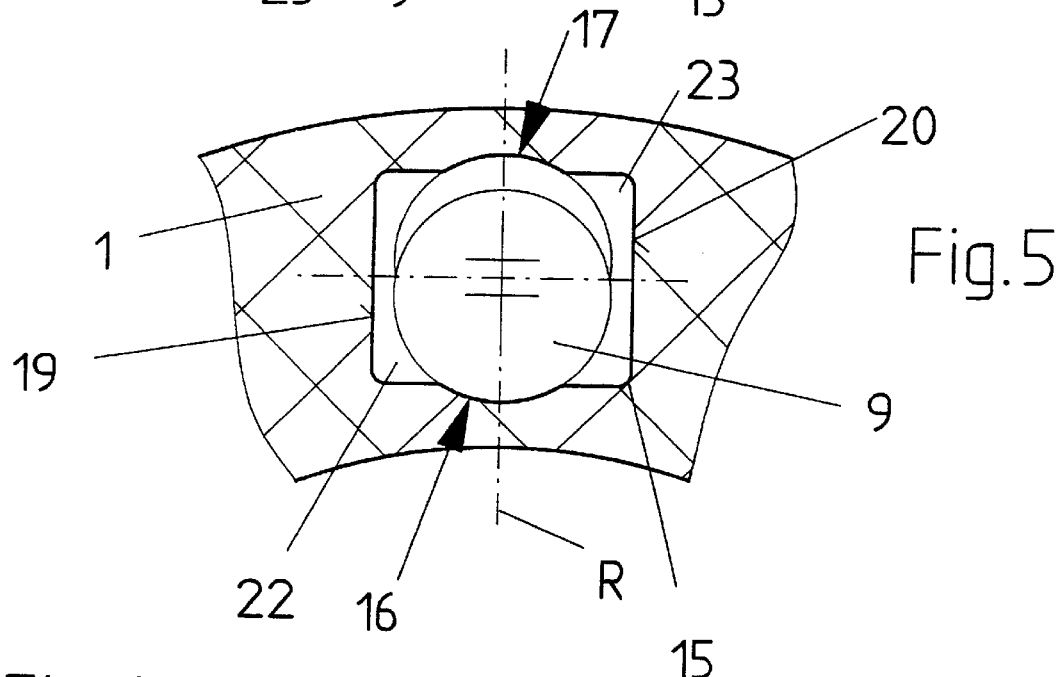
Fig. 5
Fig. 6
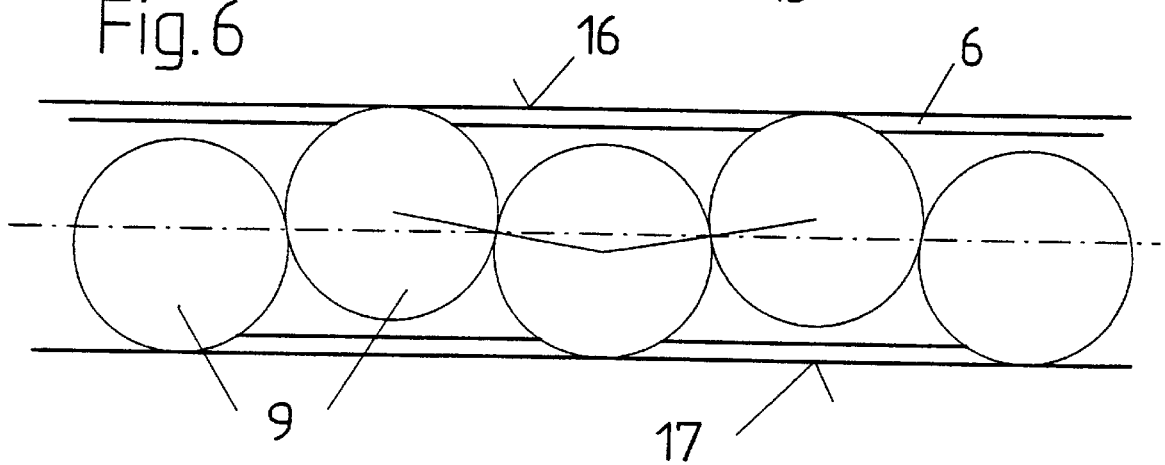

BALL BEARING FOR LONGITUDINAL MOVEMENTS

This application corresponds to and claims priority under 35 U.S.C. § 119 with respect to German Application No. P 197 41 626.8 filed on Sep. 20, 1998, the entire content of which is incorporated herein by reference.

FIELD OF THE INVENTION

The present invention generally relates to ball bearings. More particularly, the present invention pertains to ball bearings that are designed to effect longitudinal movement.

BACKGROUND OF THE INVENTION

Known designs of ball bearings that are designed to effect longitudinal movement include return channels for unloaded balls. These return channels are in most cases constructed as bores with square or circular cross-sectional configurations. In the case of return channels with circular cross-sectional configurations, the bore diameter is slightly larger than the diameter of the unloaded balls. Because the unloaded balls in the return tracks are not in contact with the shaft, they are not moved in a forcibly guided manner, but rather are pushed along by the balls leaving the load-bearing zones. When the unloaded balls are pushed through the return channels, the unloaded balls are able to move slightly to all sides because of the larger diameter or width of these return channels. Offset torques that act on the balls are thus created and result in a sliding friction with each other in the contact points of the individual balls. The balls therefore slide through the return channel. These known square or circular return tracks furthermore have little space that is suitable for storing lubricant for the balls.

DE-PS 19 31 983 describes a ball bearing for effecting longitudinal movements that includes an outer bushing with a prismatic inside and a cage. In this ball bearing, the unloaded balls are allowed to move in a groove integrated in one of the prism surfaces and merging tangentially into the other one. This known design also suffers from the disadvantage that it is not able to prevent the sliding of the unloaded balls in the return channel.

In light of the foregoing, a need exists for a longitudinal movement ball bearing that is able to prevent the unloaded balls from sliding in the guide tracks.

A need also exists for a longitudinal movement ball bearing that has sufficient room for storing lubricant.

SUMMARY OF THE INVENTION

According to the present invention, the wall of the longitudinally extending guide track for the unloaded balls has a cross-section with at least two essentially diametrically opposed sections possessing a circular contour and, offset from these sections in the peripheral direction, at least two other sections also opposing each other essentially diametrically and having a base that is set back from the circular contour. This makes it possible for the unloaded balls to contact the wall of the guide track only at essentially diametrically opposing points of the sections possessing the circular contour. This results in a rolling-off of the unloaded balls in the return track. The other sections are set back so that the balls are not able to come into contact with such sections and to also provide space for storing lubricant.

In accordance with the present invention, a ball bearing for effecting longitudinal movements includes a cage provided with at least two longitudinally extending guide tracks having opposite ends that are connected by arcuate turn around tracks, and a plurality of balls positioned in the guide track. The balls positioned in one of the guide tracks forming load-bearing balls or loaded balls and the balls positioned in another one of the guide tracks forming non-load-bearing balls or unloaded balls. The longitudinally extending guide track for the loaded balls is provided with a slit that is open radially inwardly for passage of the balls in a direction radially inwardly. The longitudinally extending guide track for the unloaded balls is covered on all sides and has an interior wall which, in cross-section, possesses at least two substantially diametrically opposed first sections having a circular contour and at least two substantially diametrically opposed second sections laterally offset from the first sections and having a base that is set back from the circular contour.

According to another aspect of the present invention, a ball bearing for effecting longitudinal movements includes a cage provided with at least two longitudinally extending guide tracks having opposite ends that are connected by arcuate turn around tracks, and a plurality of balls positioned in the guide track. The balls positioned in one of the guide tracks constitute loaded balls and the balls positioned in another one of the guide tracks constitute unloaded balls. The longitudinally extending guide track for the loaded balls are provided with a slit that is open radially inwardly for passage of the balls in a direction radially inwardly. At least one of the arcuate turn around tracks connecting the ends of the guide tracks to each other extends over a center angle greater than 180°. Thus, the balls moving through the projecting portion of the turn around track into the return track are pressed alternately against one of the two arcuately contoured side wall sections, thereby helping to ensure a uniform distribution of the balls moving into the return tracks.

According to another aspect of the present invention, a ball bearing for effecting longitudinal movements includes a cage provided with at least two longitudinally extending guide tracks having opposite ends that are connected by arcuate turn around tracks, and a plurality of balls positioned in the guide track. The balls positioned in one of the guide tracks constitute loaded balls and the balls positioned in another one of the guide tracks constitute unloaded balls. The longitudinally extending guide track for the loaded balls are provided with a slit that is open radially inwardly for passage of the balls in a direction radially inwardly. The longitudinally extending guide track for the unloaded balls has an interior wall which, in cross-section, possesses at least two substantially diametrically opposed first sections having an arcuate contour and at least two substantially diametrically opposed second sections laterally offset from the first sections and having a contour different from the arcuate contour.

BRIEF DESCRIPTION OF THE DRAWING FIGURES

The above and additional features and characteristics of the present invention will become more apparent with reference to the accompanying drawings figures in which like reference numerals denote like elements and wherein:

FIG. 4 is an enlarged cross-sectional view of a portion of a longitudinal movement ball bearing according to the present invention in the area of a return track with an exaggerated portrayal of the pocket clearance;

FIG. 5 is an enlarged cross-sectional view of a portion of the longitudinal movement ball bearing according to another embodiment of the present invention in the area of a return track;

FIG. 6 is a longitudinal view of a portion of the longitudinal movement ball bearing shown in FIG. 5;

DETAILED DESCRIPTION OF THE INVENTION

Figure 1:
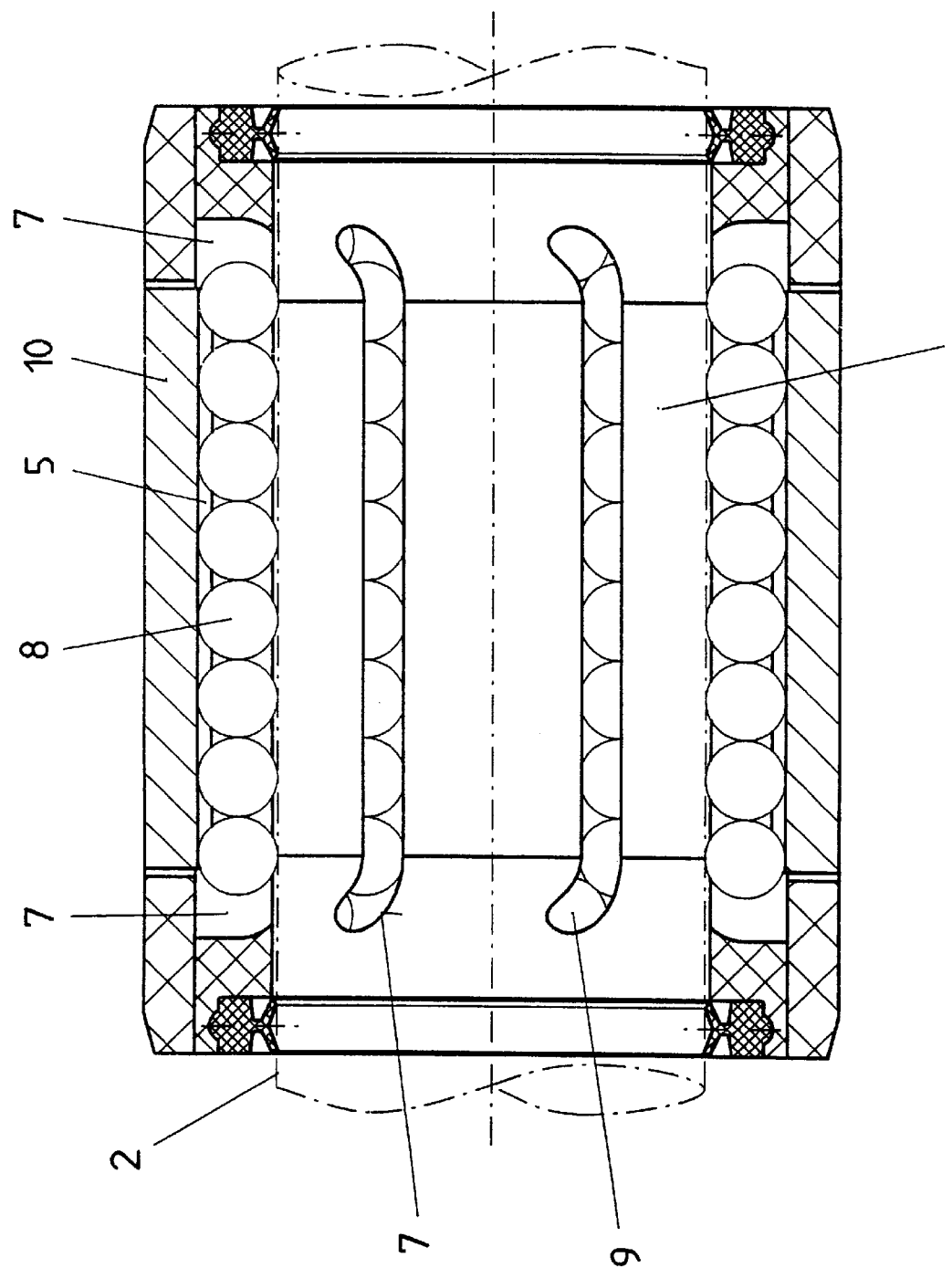
FIG. 1 is a longitudinal cross-sectional view of a known longitudinal movement ball bearing.
Figure 2:
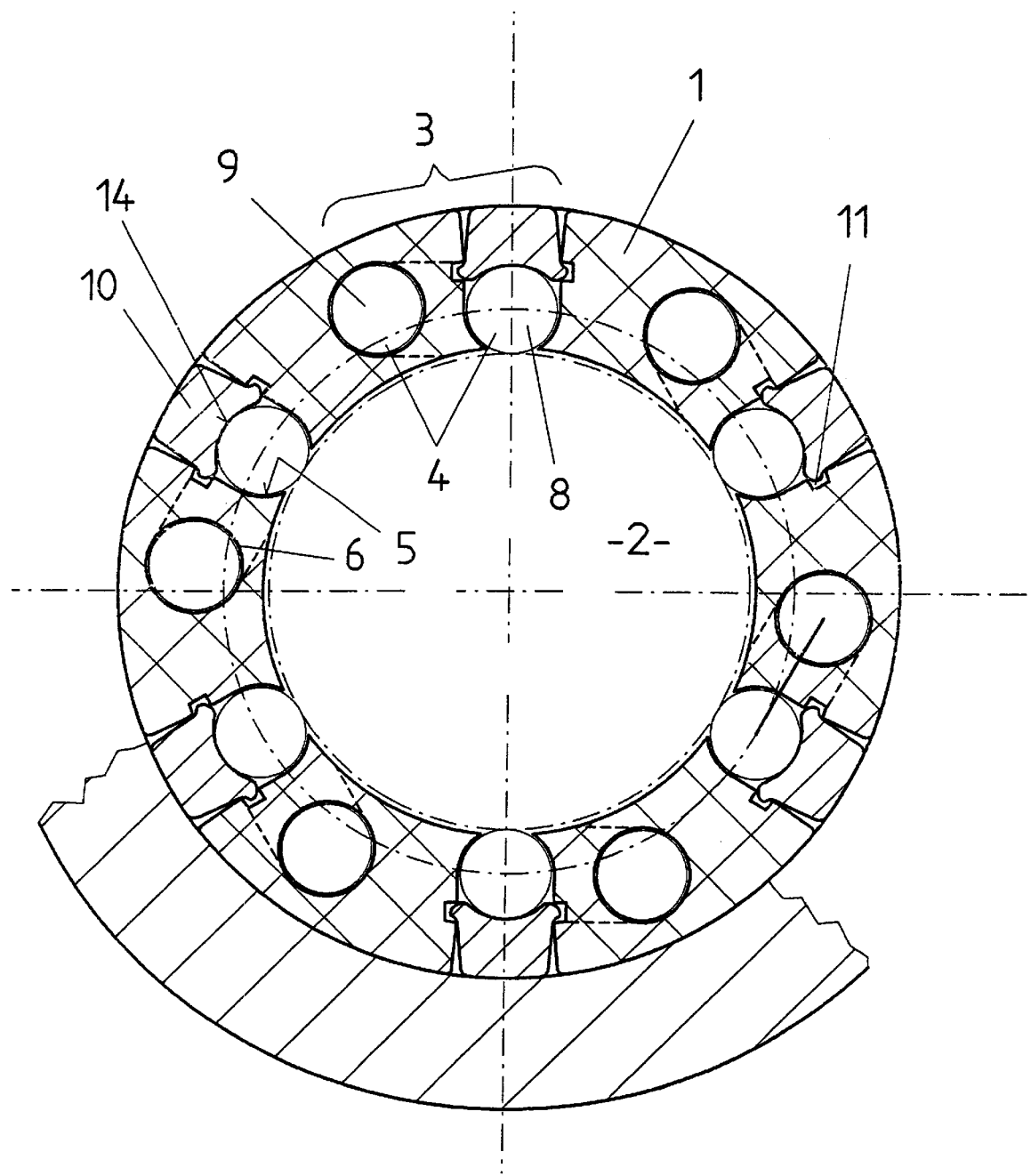
FIG. 2 is a cross-sectional view of the longitudinal movement ball bearing shown in FIG. 1.
Figure 3:
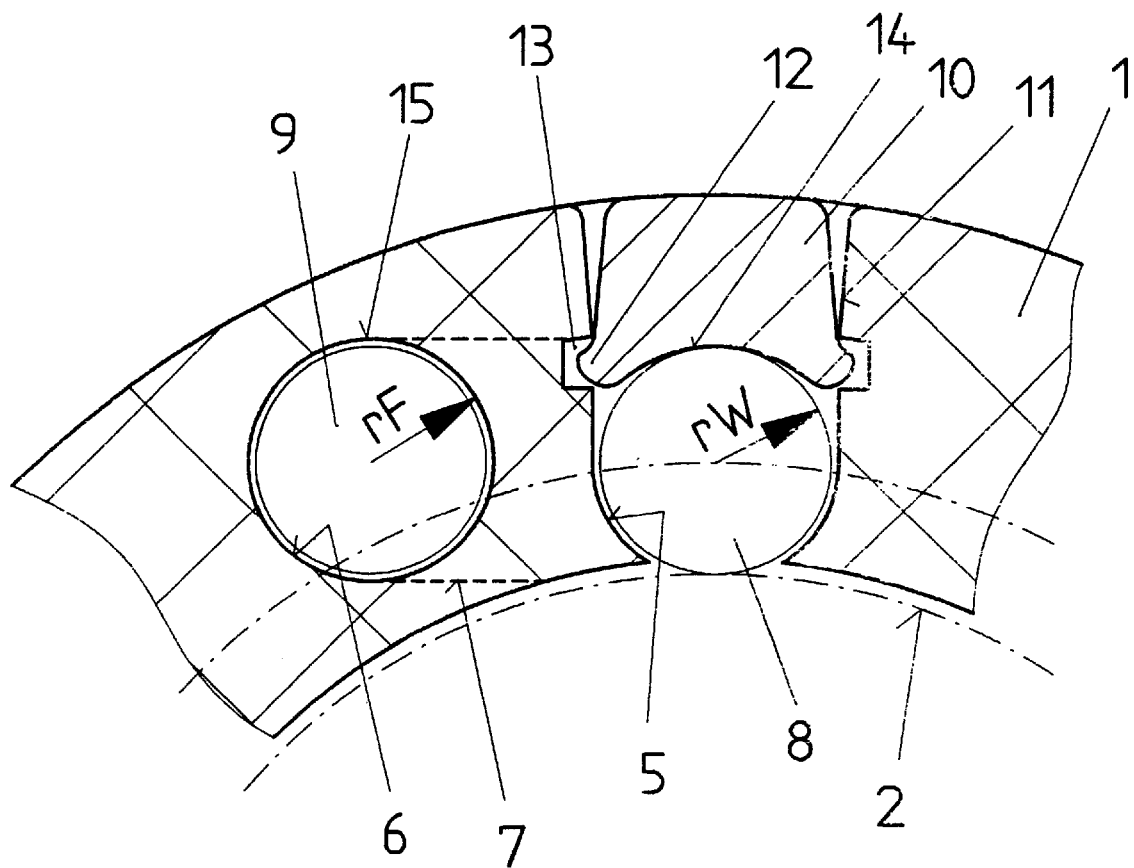
FIG. 3 is an enlarged cross-sectional view of a portion of the longitudinal movement ball bearing shown in FIG. 2 as taken through a ball guide of the ball bearing.

As seen in FIGS. 1–3, a known ball bearing for permitting longitudinal movement includes a multi-part cage 1 that is located within a housing which is partially shown in FIG. 2. The multi-part cage 1 surrounds a cylindrical shaft 2 which is illustrated in dot-dash lines in FIG. 1. The cage 1 includes a longitudinally extending center section 32 and two end caps 30 positioned on the opposite longitudinal ends of the center section 32. The end caps 30 can be made from an elastic plastic material using an extrusion process. Distributed along the periphery of the cage 1, several ball guides 3 are molded in, and an endless row of balls 4 is integrated into each of the ball guides.

Each ball guide 3 is defined by two longitudinally arranged guide tracks 5, 6 and two turn around tracks 7. The longitudinally arranged guide tracks 5, 6 are positioned next to each other at the periphery and are integrated into the center section of the cage 1. The two semicircular or arcuate turn around tracks 7 extend in a semicircular shape in the end caps which connect the longitudinally extending guide tracks 5, 6 with each other at the ends of the bearing. The load-bearing balls or loaded balls 8 in each row of balls 4 move in the guide track 5, and the non-load-bearing balls or unloaded balls 9 move in the two turn around tracks 7 and in the adjacent return guide track 6 in the cage 1. The balls 8, 9 are manufactured from roller bearing steel. The longitudinally extending tracks 5 for the loaded balls 8 are each provided with a radially inwardly opening slit illustrated in FIG. 3 for exposing the balls 8 radially inwardly against the shaft.

Each guide track 5 for the loaded balls 8 is covered radially from the outside by a load-carrying track plate 10 made from hard steel which is set into a corresponding opening 11 in the center section of the cage 1 and is supported in a bore of the housing. The track plates 10 are made from blanks cut to length from a strip of material. The track plates 10 each include lateral projections 12.

During installation of the track plates 10, each of the track plates 10 are pressed radially from the outside towards the inside into one of the openings 11 of the center section of the cage 1 so that the lateral projections 12 of the track plate 10 snap into an undercut 13 in the opposing wall of the opening 11. The engagement of the lateral projections 12 of the track plate 10 into the undercut 13 holds the track plates 10 in the respective opening 11 in a captive manner as shown in FIG. 3.

Each track plate 10 has on its radially inwardly facing side a longitudinally extending track groove 14 possessing a circular cross-section adapted to correspond to the contour of the balls 8, 9. The loaded balls 8 of the corresponding row of balls 4 move between the shaft 2 and the track groove 14 of the track plate 10 as shown in FIG. 2.

As mentioned above, each of the longitudinal ends of the track groove 14 is followed by one of the turn around tracks 7 that is integrated into the end cap of the cage 1. Each of these turn around tracks 7 ends in a guide track 6 for the unloaded balls 9 that is integrated into the center section of the cage 1.

As can be seen in FIG. 3, the guide track 6 is constructed as a round bore in this embodiment so that the wall 15 has a circular cross-section with a curvature radius $r_F$. This curvature radius $r_F$ is slightly larger than the curvature radius $r_W$ of the balls 9.

In this known design with the wall 15 of the guide track 6 that is closed on all sides, the balls 9 are able to move against any area of the wall 15. Because of this, the balls in the guide track 6 do not roll properly, but rather are pushed through the guide tracks in a sliding manner.

In contrast, according to the present invention as illustrated in FIG. 4, the wall 15 of the longitudinally extending guide track 6 for the unloaded balls 9 is constructed in the cage 1 with a cross-sectional configuration having two diametrically opposed sections 16, 17 and two other diametrically opposed sections 19, 20. The two diametrically opposed sections 16, 17 possess a circular or arcuate contour and the two other diametrically opposed sections 19, 20, which are offset in the peripheral direction, each possess a base 21 that is linear or constructed in a straight line manner. This base 21 is advantageously set back relative to the circular or arcuate contour 18 of the first sections 16, 17.

The curvature radius $r_F$ of the circular contour 18 equals the radius $r_W$ of the unloaded balls 9. It is also to be seen that the diametrically opposed sections 16, 17 possess a different contour than the other two diametrically opposed sections 19, 20 to thereby provide the noted set back. The different contour between the pairs of sections to provide the set back can be other than the arcuate and linear contours illustrated.

In the embodiment shown in FIG. 4, the diametrically opposed sections 16, 17 are located diametrically on opposite sides of the radial axis R passing through the bearing center and the center of the non-load-bearing balls 9. Also, the diametrically opposed sections 16, 17 are spaced apart from the diametrically opposed sections 19, 20 by 90°.

FIG. 5 shows an alternative embodiment in which the diametrically opposed sections 16, 17 are located in the upper and lower parts of the cage 1. That is, the diametrically opposed sections 16, 17 face each other on the radial axis R so as to be located at the radially inwardly located and radially outwardly located portions of the guide tracks.

The configuration of the guide tracks in accordance with the present invention makes it possible for the unloaded balls 9 to rest only against sections 16 and 17 of the wall 15 of the guide track 6 as shown in FIG. 6, and are guided with a rolling-off motion through the guide tracks 6 in the cage. The set-back sections 19, 20 no longer come into contact with the unloaded balls 9. In addition, the set-back sections 19, 20 advantageously form free spaces 22, 23 for storing lubricant.

Figure 7:
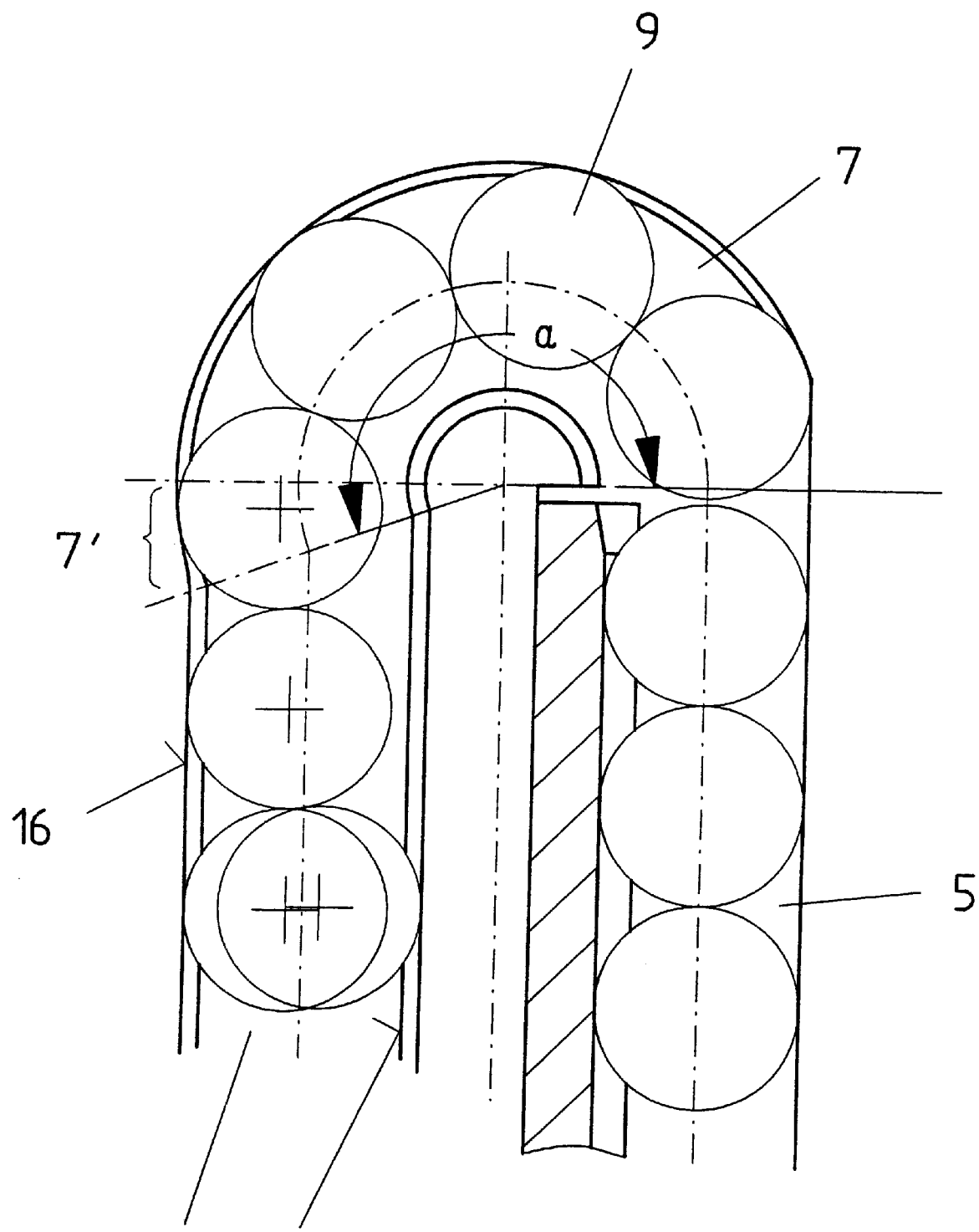
FIG. 7 is a top view of a portion of the longitudinal movement ball bearing according to the present invention illustrating the row of balls of the ball bearing.

In the aspect of the present invention shown in FIG. 7, the turn around tracks 7 for the unloaded balls 9 are arranged in a manner different from the usual configuration of the turn around tracks. Typically, the turn around tracks 7 for the unloaded balls 9 are arranged to form a center angle of 180°, meaning that the center lines of the turn around tracks connect tangentially to the center lines of the parallel guide tracks. In accordance with the present invention, however, the turn around tracks for the unloaded balls 9 form a center angle greater than 180° as shown in FIG. 7,. This center angle α is preferably about 200°. As a result, the balls 9 moving through the projecting section 7' of the turn around track 7 into the return track 6 are pressed alternately against one of the two side wall sections 16, 17 that possess the arcuate or circular contour 18. This thus helps ensure a uniform distribution of the balls moving into the return tracks.

Figure 8:
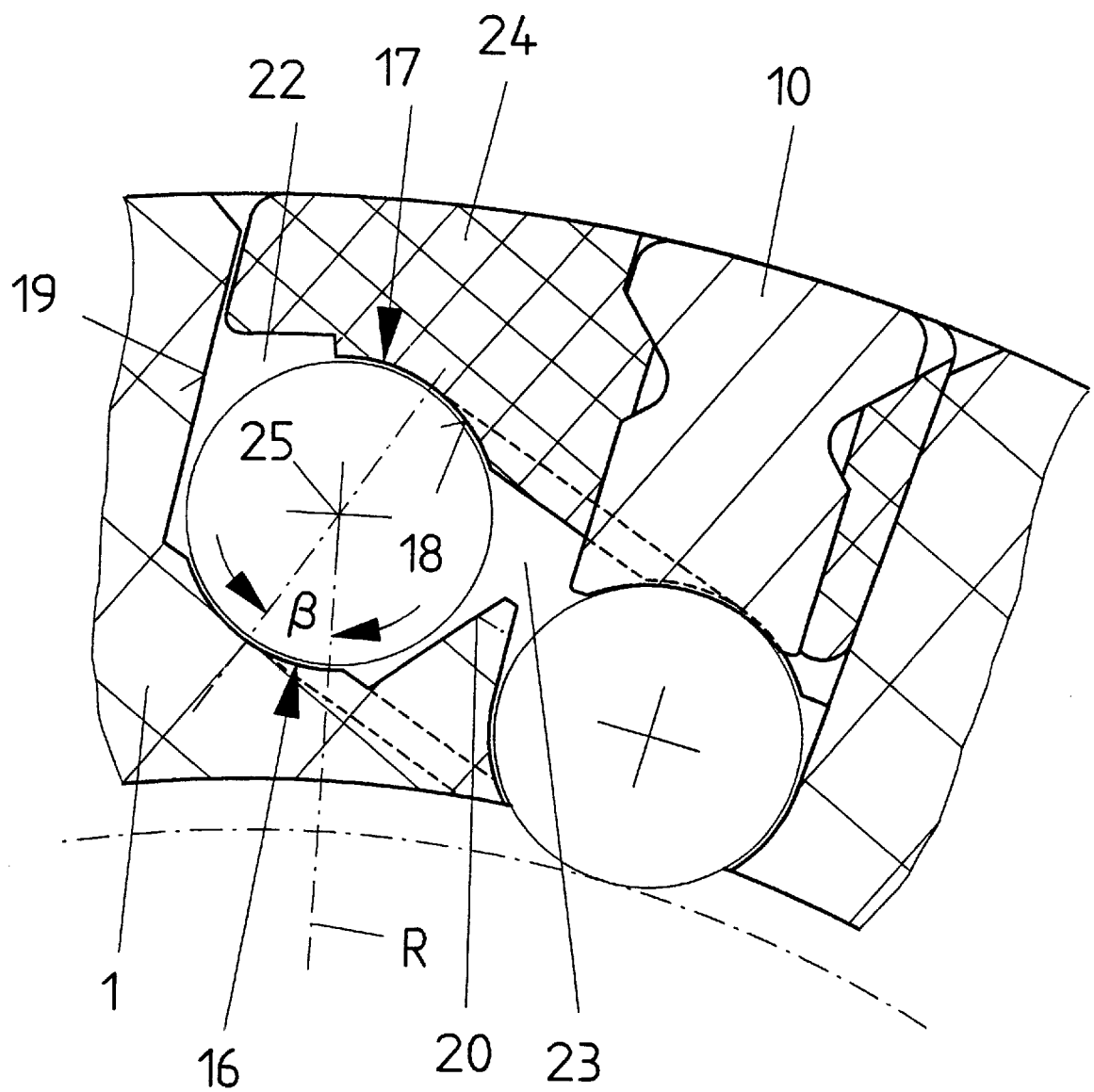
FIG. 8 is an enlarged cross-sectional view of a portion of the longitudinal movement ball bearing according to the present invention illustrating a modified version of the ball bearing.

FIG. 8 shows another embodiment of the ball bearing in which each endless row of balls is covered by a cover plate 24 that is made, for example, from plastic material. The cover plates 24 are inserted into a corresponding opening in the cage 1 and carrying one track plate 10 each. In this construction, the diametrically opposed sections 16, 17 constructed with a circular contour 18 are arranged at an angle β to the radial R, with the radial R being defined as the connecting line between the bearing center and the center 25 of the non-load-bearing ball 9. The angle β is normally on the order of about 20°. One of the diametrically opposed sections 16 is formed in the cage 1 and the other section 17 is formed in the cover plate 24. Diametrically opposed set back sections 19, 20 are once again formed and these set back sections 19, 20 form supply chambers 22, 23 for the lubricants.

As described above, the curvature radius of the diametrically opposed sections possessing a circular contour are equal to the curvature radius of the balls 8, 9. In this situation, 100% osculation between each ball and the respective guide track is achieved. However, it is to be understood that the curvature radius of the diametrically opposed sections 16, 17 possessing a circular or arcuate contour can be larger than the curvature radius of the balls 8, 9 to thereby achieve a two-point contact with the guide track or can be smaller than the curvature radius of the balls 8, 9 to thereby achieve a four-point contact with the guide track.

Another advantageous aspect of the present invention involves constructing the diametrically opposed sections 16, 17 possessing a circular contour to have a higher coefficient of friction than is typically the case with bearings of this kind. This can be achieved by, for example, roughening the sections 16, 17. This is in contrast to the polished cage surfaces that are typically used in bearings of this kind. It is also possible for these sections 16, 17 to be made from softer materials, for example an elastomer or rubber, or to position inserts made from such materials into these sections 16, 17.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. Ball bearing for effecting longitudinal movements, comprising a cage provided with at least two longitudinally extending guide tracks having opposite ends that are connected by arcuate turn around tracks, and a plurality of balls positioned in said guide tracks, with balls positioned in one of the guide tracks forming loaded balls and balls positioned in another one of the guide tracks forming unloaded balls, the longitudinally extending guide track for the load-bearing balls being provided with a slit that is open radially inwardly for passage of the balls in a direction radially inwardly, the longitudinally extending guide track for the unloaded balls being covered on all sides and having an interior wall which, in cross-section, possesses at least two substantially diametrically opposed first sections having a circular contour and at least two substantially diametrically opposed second sections laterally offset from the first sections and having a base that is set back from the circular contour.

2. Ball bearing for effecting longitudinal movements according to claim 1, wherein said two first sections possessing a circular contour are arranged at radially inwardly and radially outwardly located portions of the inner wall.

3. Ball bearing for effecting longitudinal movements according to claim 2, wherein said two first sections possessing a circular contour oppose each other at an angle to a radial axis passing through a center of the bearing center and through a center of the unloaded balls.

4. Ball bearing for effecting longitudinal movements according to claim 1, wherein the bearing possesses a radial axis and said two first sections possessing a circular contour oppose each other at an angle of 90° to the radial axis.

5. Ball bearing for effecting longitudinal movements according to claim 4, wherein said two first sections possessing a circular contour have a curvature radius equal to a curvature radius of the balls.

6. Ball bearing for effecting longitudinal movements according to claim 4, wherein said two first sections possessing a circular contour have a curvature radius greater than a curvature radius of the balls.

7. Ball bearing for effecting longitudinal movements according to claim 4, wherein said two first sections possessing a circular contour have a curvature radius less than a curvature radius of the balls.

8. Ball bearing for effecting longitudinal movements according to claim 1, wherein said two first sections possessing a circular contour have a curvature radius equal to a curvature radius of the balls.

9. Ball bearing for effecting longitudinal movements according to claim 1, wherein said two first sections possessing a circular contour have a curvature radius greater than a curvature radius of the balls.

10. Ball bearing for effecting longitudinal movements according to claim 1, wherein said two first sections possessing a circular contour have a curvature radius less than a curvature radius of the balls.

11. Ball bearing for effecting longitudinal movements according to claim 1, wherein the turn around tracks connecting the ends of the guide tracks to each other extend over a center angle greater than 180°.

12. Ball bearing for effecting longitudinal movements according to claim 1, wherein said two first sections possessing a circular contour have a high coefficient of friction.

13. Ball bearing for effecting longitudinal movements according to claim 12, wherein said two first sections possessing a circular contour are roughened.

14. Ball bearing for effecting longitudinal movements according to claim 12, wherein said two first sections possessing a circular contour are made from softer, elastically pliable material.

15. Ball bearing for effecting longitudinal movements, comprising a cage provided with at least two longitudinally extending guide tracks having opposite ends that are connected by arcuate turn around tracks, and a plurality of balls positioned in said guide tracks, with balls positioned in one of the guide tracks forming loaded balls and balls positioned in another one of the guide tracks forming unloaded balls, the longitudinally extending guide track for the loaded balls being provided with a slit that is open radially inwardly for passage of the balls in a direction radially inwardly, the longitudinally extending guide track for the unloaded balls having an interior wall which, in cross-section, possesses at least two substantially diametrically opposed first sections having an arcuate contour and at least two substantially diametrically opposed second sections laterally offset from the first sections and having a contour different from the arcuate contour.

16. Ball bearing for effecting longitudinal movements according to claim 15, wherein the bearing possesses a radial axis and said two first sections possessing an arcuate contour oppose each other at an angle of 90° to the radial axis.

17. Ball bearing for effecting longitudinal movements according to claim 15, wherein said at least two substantially diametrically opposed second sections have a base that is linear.

18. Ball bearing for effecting longitudinal movements according to claim 15, wherein said two first sections possessing an arcuate contour are arranged at radially inwardly and radially outwardly located portions of the inner wall.

19. Ball bearing for effecting longitudinal movements according to claim 15, wherein said two first sections possessing an arcuate contour oppose each other at an angle to a radial axis passing through a center of the bearing center and through a center of the unloaded balls.

* * * * *